United States Patent

Kissin et al.

Patent Number: 5,506,184
Date of Patent: Apr. 9, 1996

[54] OLEFIN POLYMERIZATION CATALYST SYSTEM

[75] Inventors: Yury V. Kissin, East Brunswick; Robert I. Mink, Warren, both of N.J.

[73] Assignee: Mobil Oil Corporation, Fairfax, Va.

[21] Appl. No.: 264,206

[22] Filed: Jun. 22, 1994

[51] Int. Cl.⁶ .......................................... B01J 31/38
[52] U.S. Cl. ................. 502/115; 502/116; 502/123; 502/125; 502/152; 502/155; 502/156; 526/90
[58] Field of Search ...................... 502/115, 116, 502/123, 125, 152, 155, 156; 526/90

[56] References Cited

U.S. PATENT DOCUMENTS

| | | | |
|---|---|---|---|
| 4,452,914 | 6/1984 | Coleman, III et al. | 502/122 |
| 4,482,639 | 11/1984 | Desmond et al. | 502/117 |
| 4,555,497 | 12/1985 | Coleman, III et al. | 502/115 |
| 4,622,309 | 11/1986 | Coleman, III et al. | 502/115 |
| 4,820,786 | 4/1989 | Bacskai | 526/152 |
| 5,043,408 | 8/1991 | Kakugo et al. | 526/347 |
| 5,086,135 | 2/1992 | Kissin | 526/151 |
| 5,280,000 | 1/1994 | Kakugo et al. | 502/121 |

OTHER PUBLICATIONS

CA 114:229616a and CA 110:115484t.

*Primary Examiner*—F. Rollins Cross
*Assistant Examiner*—Timothy H. Meeks
*Attorney, Agent, or Firm*—Alexander J. McKillop; Malcolm D. Keen; Marina V. Schneller

[57] ABSTRACT

A catalyst composition for olefin polymerization and copolymerization which contains a transition metal complex with a bidentate or a tridentate ligand and a cocatalyst mixture containing dialkylaluminum halide and dialkylmagnesium.

The transition metal complexes with bidentate ligands L have the empirical formula $LMX_2$, $LMXY$ or $L_2M$ where M is Ti, V, Zr or Hf; X is an alkoxy group, an aryloxy group, or a halogen atom; Y is a mono- or double-bonded ligand different from X.

The bidentate L ligands are described by general formulas $$Z-R-Z \text{ OR } Z-R-W-R-Z$$

where R is an alkylene group, a cycloalkylene group, an arylene group (unsubstituted or alkyl-substituted) or an alkylarylene group; W is $CH_2$, O, S, N—R', or $SiR'_2$ where R' is an alkyl or an aryl group; and Z is an oxygen atom, a sulfur atom, an N—H group or a C(=O)—O group.

The transition metal complexes with tridentate ligands L' have the empirical formula L'MX where M is Ti, V, Zr or Hf; X is an alkoxy group, an aryloxy group, or a halogen atom.

The tridentate L' ligands are described by general formulas

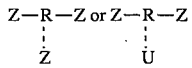

where R is an alkylene group or an arylene group; and Z and U are different and are an oxygen atom, a sulfur atom, an N—H group or a C(=O)—O— group.

19 Claims, 1 Drawing Sheet

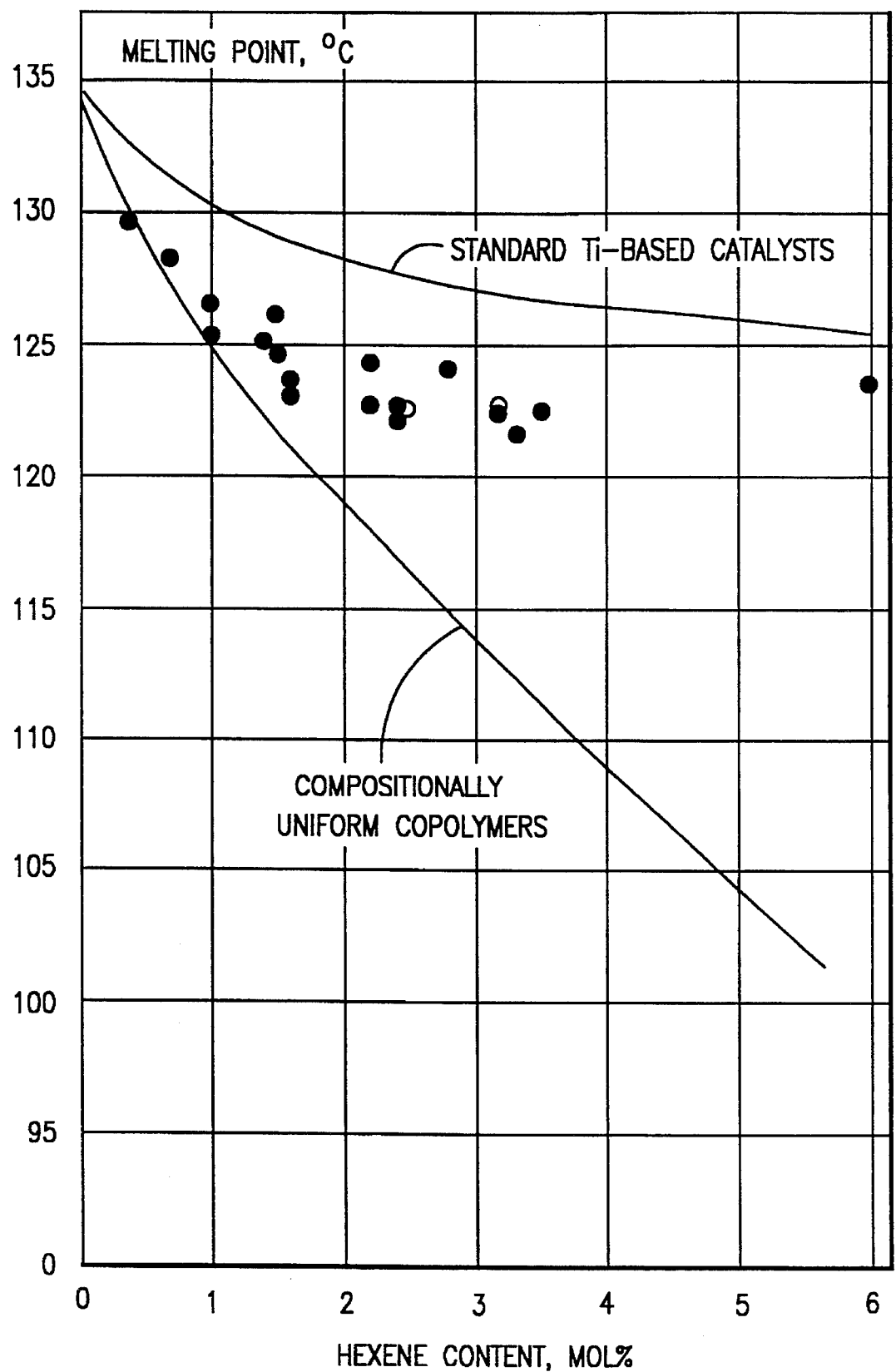

OLEFIN POLYMERIZATION CATALYST SYSTEM

FIELD OF THE INVENTION

The invention relates to a catalyst composition for olefin polymerization which comprises a complex of a transition metal and a cocatalyst mixture effective to activate the complex.

The transition metal complex contains a multidentate ligand. The mixture effective to activate the complex is referred to as a cocatalyst and mixed cocatalyst interchangeably herein.

These catalyst systems exhibit very high activities in ethylene homopolymerization and ethylene-alpha-olefin copolymerization reactions. Ethylene copolymers produced with these catalyst systems have decreased melting points compared to the resins produced by commercial conventional Ziegler catalysts, which indicates a more homogeneous compositional distribution of the copolymers. The catalysts can be also used for polymerization of higher alpha-olefins, in high-temperature polymerization reactions and for the synthesis of elastomers.

SUMMARY OF THE INVENTION

The invention relates to an olefin polymerization and copolymerization catalyst composition comprising (A) a complex of the empirical formula selected from the group consisting of $LMX_2$, LMXY, L'MX and $L_2M$ wherein M is a transition metal;

X is an alkoxy or aryloxy group or a halogen atom;

Y is an alkoxy or aryloxy group or a halogen atom different from X, or an oxygen atom;

L is a bidentate ligand Z—R—Z or Z—R—W—R—Z, wherein R is an alkylene, cycloalkylene or arylene group, unsubstituted or alkyl-substituted, W is $CH_2$, O, S, N—R' or $SiR'_2$ where R' is alkyl or aryl group, and Z is an oxygen atom, a sulfur atom, an N—H group or a C(=O)—O group;

L' is a tridentate ligand

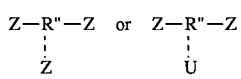

where U is different from Z and is an oxygen atom, a sulfur atom, an N—H or a C(=O)—O— group and R" is an alkylene, cycloalkylene or arylene group; and (B) a combination of an alkylaluminum halide and an organomagnesium compound, wherein the combination is characterized by a molar [Al]:[Mg] ratio of greater than 1.

DESCRIPTION OF THE DRAWING(S)

FIG. 1 is a graph of a plot of melting point temperature (°C.) vs. the 1-hexene content for ethylene-1-hexene copolymers prepared with the catalyst systems of this invention (dots), with metallocene catalysts (the lower curve) and with conventional titanium-based catalysts (the upper curve).

DETAILED DESCRIPTION OF THE INVENTION

The catalyst composition of the invention comprises a transition metal complex (A) and a cocatalyst system therefor, (B). The cocatalyst system comprises two components, an alkylaluminum halide and an organomagnesium compound, which are used at a molar [Al]:[Mg] ratio of greater than 1. The alkylaluminum halide contains alkyl groups of 1 to 8 carbon atoms; and the halide is preferably chlorine. Preferably, the alkylaluminum halide is a dialkylaluminum halide; examples include dimethylaluminum chloride, diethylaluminum chloride, dipropylaluminum chloride, dibutylaluminum chloride, dipentylaluminum chloride and dihexylaluminum chloride, in which the alkyl group is branched or linear. The organomagnesium compound is preferably a dialkylmagnesium, $R_1MgR_2$, in which $R_1$ and $R_2$ are the same or different and are alkyl groups containing 1 to 10 carbon atoms, preferably 2 to 8 carbon atoms; thus each of $R_1$ and $R_2$ may be selected from the group conisting of methyl, ethyl, propyl, isopropyl, butyl, sec-butyl, tert-butyl, pentyl (branched or linear), hexyl (branched or linear), or octyl (branched or linear).

The transition metal complex (A) has an empirical formula selected from the group consisting of

In the empirical formula of the complex, M is a transition metal preferably selected from the group consisting of Ti, V, Zr, or Hf.

In the empirical formula of the complex, X is an alkoxy or aryloxy group or a halogen atom. The alkoxy group may have 1 to 6 carbon atoms, and can be selected from the group consisting of methoxy, ethoxy, propoxy, isopropoxy, butoxy, i-butoxy, t-butoxy, and the like. The aryloxy may be a phenoxy, alkylphenoxy, arylphenoxy, naphthoxy, alkyl naphthoxy or arylnaphthoxy group. The halogen atom may be florine, chlorine, bromine or iodine, but preferably is chlorine. Particular examples of X are the methoxy group, the ethoxy group, the isopropoxy group or Cl; a particular example of Y is an oxygen atom.

In the empirical formula of the complex, Y is an oxygen atom or an alkoxy or aryloxy group or a halogen atom different from X.

In the empirical formula of the complex, L is a bidentate ligand Z—R—Z or Z—R—W—R—Z wherein R is alkylene group of 2 to 6 carbon atoms; cycloalkylene group of 5 or 6 carbon atoms; or unsubstituted or alkyl-substituted arylene group, such as a phenyl or naphthyl group,

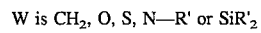

where R' is an alkyl group of 1 to 10 carbon atoms or an aryl group, and

Z is an oxygen atom, a sulfur atom, an N—H or a C(=O)—O— group.

In the empirical formula of the complex, L' is a tridentate ligand

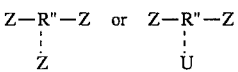

where U is different from Z and is an oxygen atom, a sulfur atom, an N—H or a C(=O)—O group, and R" is an alkylene, cycloalkylene or arylene group.

The preferred substitution types in the multidentate ligands L and L' are such which afford their unimpeded coordination to the metal atom M. Particular examples of L and L' are alkyldioxy, alkyldiamino, alkyldicarboxy, biaryldioxy, biaryldicarboxy or alkylaminodioxy ligands, in which the alkyl groups contain 2 to 6 carbon atoms. Specific ligands L or L' are derived from 1,2,6-hexanetriol; 1,5-hexanediol; diglycolic acid; camphoric acid; 2-hydroxybenzyl alcohol; 1,1'-bi-2-naphthol; bis(2-hydroxyphenyl)methane; 2,2'-biphenol; diphenic acid; cis-1,2-diaminocyclohexane; 1,4,7-triazacyclononane; diethanolamine; L-glutamic acid; 1-[N,N-bis(2-hydroxyethyl)amino]-2-propanol.

The reactions to form the transition metal complexes are undertaken by contacting a compound of the transition metal with a compound which is a source of L and/or L'. The transition metal compound can be an alkoxide or halide. Specific transition metal compounds include titanium tetraisopropoxide; titanium tetrachloride; zirconium tetraisopropoxide; vanadyl triisopropoxide. The contact is undertaken in a polar solvent such as tetrahydrofuran, at temperatures ranging from 0° to 100° C., under inert conditions; The recovery of the transition metal complex comprises removing solvent at temperatures of 20° to 100° C., preferably 40° to 80° C. Removal of solvent can be by evaporation.

The complexes containing bidentate and tridentate liquids are crystalline solids or heavy viscous liquids. Each complex, depending on the type of the transition metal, the multidentate ligand and the complex composition, has a particular color. The complexes were characterized by their infrared spectra, as shown in the examples below.

The transition metal complexes containing multidentate ligands can be used in a pure state or supported on inert carriers. The transition metal complex portion of the catalyst may be activated by the cocatalyst prior to its introduction into the polymerization reactor or it may be activated in the polymerization reactor, whether or not the catalyst is supported. If supported, the production of the catalyst composition may be formed by various sequence(s) of steps. Preferably, the supported catalyst may contain the transition metal complex, deposited or impregnated on an inert porous support, which is subsequently contacted with the cocatalyst, prior to or after introduction into the reactor.

The carrier materials for the supported catalyst compositions of the invention are solid, particulate, porous, preferably inorganic materials which are inert to the other components of the catalyst composition and to the other active components of the reaction system. These carrier materials include inorganic materials, such as oxides of silicon and/or aluminum. The carrier material is used in the form of a dry powder having an average particle size of from about 1 micron to about 250 microns, preferably from about 10 microns to about 150 microns. The carrier material is preferably porous and has a surface area of preferably at least 50 m²/gm. The carrier material should be free of absorbed water. Drying of the carrier material can be effected by heating at about 100° C. to about 1000° C., preferably at about 600° C. When the carrier is silica, it is heated at at least 200° C., preferably about 200° C. to about 850° C. and most preferably at about 600° C.

In the most preferred embodiment, the carrier is silica which, prior to the use thereof in the first catalyst synthesis step, has been dehydrated by fluidizing it with air or nitrogen and heating at about 600° C. The silica of the most preferred embodiment is a high surface area, amorphous silica with a specific surface area of 300 m²/g.

The carrier material is slurried in a polar solvent and the resulting slurry is contacted with the catalyst components of the catalyst composition of the invention.

Polymerization

Alpha-olefins are polymerized with the catalysts prepared according to the present invention by any suitable process. Such processes include polymerizations carried out in suspension, in solution or in the gas phase.

The molecular weight of the polymer may be controlled in a known manner, e.g., by using hydrogen. The molecular weight distribution of the polymers prepared in the presence of the catalysts of the present invention, as expressed by the MFR values, varies from about 25 to about 80 for LLDPE products having a density of about 0.900 to about 0.940 g/cc, and an $I_2$ (melt index) of about 0.1 to about 100. MFR is defined herein as the ratio of the high load melt index (HLMI or $I_{21}$) divided by the melt index, i.e., MFR=$I_{21}/I_2$.

The linear polymers prepared in accordance with the present invention are homopolymers of alpha-olefins [e.g. ethylene, propylene, 4-methyl/1-pentene and the like] or copolymers such as copolymers of ethylene with one or more $C_3$–$C_{10}$ alpha-olefins. Thus, copolymers having two monomeric units are possible as well as terpolymers having three monomeric units. The copolymers can be partially crystalline or completely amorphous, depending on composition. Particular examples of ethylene copolymers include ethylene/1-butene copolymers, ethylene/1-hexene copolymers, ethylene/1-octene copolymers and ethylene/4-methyl-1-pentene copolymers.

The following examples further illustrate the essential features of the invention. However, it will be apparent to those skilled in the art that the specific reactants and reaction conditions used in the Examples do not limit the scope of the invention.

EXAMPLES

All catalysts syntheses were carried out in dried solvents under nitrogen atmosphere. Polymerization experiments were carried out in two different stainless-steel reactors, with volumes of 0.5 and 1.6 liters, respectively. Each autoclave was equipped with a stirrer, a thermocouple and several ports for adding reaction components. The reactors were purged with nitrogen flow at 100° C. for 1 hour before polymerization experiments. All solvents and monomers used in polymerization reactions were deoxygenated and dried prior to use.

Example 1

(A) Synthesis of a 1:1 complex from 1,2,6-hexanetriol and titanium tetraisopropoxide. 1,2,6-hexanetriol (0.134 g, 1.0 mmol) was dissolved in 5 cc of dry tetrahydrofuran (THF) at 25° C. Titanium tetraisopropoxide, Ti(Oi—Pr)$_4$ (0.30 cc, 1.0 mmol) was added to the solution, the mixture was stirred at 55° C. for 30 min and then the solvent was removed by evaporation at 55°–60° C. The residue is a white crystalline solid (0.150 g recovered). The OH stretching band in its IR spectrum (at ca. 3430 cm$^{-1}$) is greatly reduced compared to the spectrum of the original 1,2,6-hexanetriol, and the C—O stretching band is shifted from 1057 cm$^{-1}$ in the spectrum of the triol to 1126 cm$^{-1}$ in the spectrum of the complex.

(B) Ethylene-1-hexene Copolymerization. 0.5-liter reactor was filled with 200 cc of n-heptane and 50 cc of 1-hexene. The catalyst components were added to the autoclave in the following sequence: (a) 2.0 cc of 1 mol/l solution of Al(CH$_3$)$_2$Cl in heptane; (b) 1.0 cc of 1.0 mol/l solution of Mg(C$_4$H$_9$)$_2$ in heptane, after which the autoclave was heated to 70° C., (c) 0.0020 g (8.4·10$^{-3}$ mmol) of the complex of Example 1-A. Ethylene was admitted to the autoclave to maintain a total pressure of 100 psig. The polymerization reaction was carried out for 15 min to yield 25.0 g of ethylene-hexene copolymer containing 4.2 mol. % of hexene. The resin has an $I_2$ value of 0.12 and the MFR value of 44.6.

Example 2

(A) Preparation of a supported catalyst containing the 1:1 complex from 1,5-hexanediol and titanium tetraisopropoxide. Silica (Davison 955-600, calcined at 600° C. in air for 16 h, 0.5 g) was mixed with 1,5-hexanediol (0.118 g, 1.0 mmol) and the mixture was slurried in 3 cc of THF at 25° C. Ti(Oi—Pr)$_4$ (0.30 cc, 1.0 mmol) was added to the slurry and the solvent was evaporated at 55°–60° C. to yield white powder.

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 100° C., (c) 0.0012 g of the catalyst of Example 2-A (contains $2.4 \cdot 10^{-3}$ mmol Ti). Reactor was pressurized with hydrogen (10 psi) and ethylene was admitted to maintain a total pressure of 120 psig. The polymerization reaction was carried out for 15 min to yield 25.5 g of ethylene-hexene copolymer containing 4.4 mol. % of hexene (productivity ca. 22,200 g/g cat). The resin has an $I_{21}$ value of 6.4 and MFR of 59.9.

Example 3

(A) Synthesis of a 1:1 complex from diglycolic acid and titanium tetraisopropoxide. Diglycolic acid (0.134 g, 1.0 mmol) was dissolved in 3 cc of THF at 25° C. Ti(Oi—Pr)$_4$ (0.30 cc, 1.0 mmol) was added to the solution, the mixture was stirred at 55° C. for 30 min and then the solvent was removed by evaporation at 55°–60° C. The residue is a white crystalline solid (0.240 g recovered).

(B) Ethylene homopolymerization. A 0.5-liter reactor was filled with 200 cc of n-heptane. The catalyst components were added to the autoclave in the following sequence: (a) 2.0 cc of 1.5 mol/l solution of Al(C$_2$H$_5$)$_2$Cl in heptane; (b) 1.0 cc of 1.0 mol/l solution of Mg(C$_4$H$_9$)$_2$ in heptane, after which the autoclave was heated to 70° C., (c) 0.0020 g ($6.7 \cdot 10^{-3}$ mmol) of the complex of Example 3-A. Ethylene was admitted to the autoclave to maintain a total pressure of 100 psig. The polymerization reaction was carried out for 15 min to yield 30.0 g of ethylene homopolymer (productivity ca. 11,200 g/g cat).

(C) Ethylene-1-hexene Copolymerization. A 0.5-liter reactor was filled with 200 cc of n-heptane and 50 cc of 1-hexene. The catalyst components were added to the autoclave in the following sequence: (a) 2.0 cc of 1.5 mol/l solution of Al(C$_2$H$_5$)$_2$Cl in heptane; (b) 1.0 cc of 1.0 mol/l solution of Mg(C$_4$H$_9$)$_2$ in heptane, after which the autoclave was heated to 70° C., (c) 0.0198 g of a physical mixture prepared from 0.010 g of the complex of Example 3-A and 1.0 g of dry silica used as an inert diluent (the mixture contains $6.6 \cdot 10^{-4}$ mmol Ti). Ethylene was admitted to the autoclave to maintain a total pressure of 100 psig. The polymerization reaction was carried out for 20 min to yield 12.8 g of ethylene-hexene copolymer containing 1.0 mol. % of hexene (productivity Ca. 64,600 g/g cat). The resin has an $I_{21}$ value of 0.28. The copolymer has a melting point of 124.7° C.

(D) Ethylene-1-hexene Copolymerization. A 0.5-liter reactor was filled with 100 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.020 g of a mixture prepared from 0.010 g of the complex of Example 3-A and 1.0 g of dry silica ($6.6 \cdot 10^{-4}$ mmol Ti). Ethylene was admitted to the autoclave to maintain a total pressure of 100 psig. The polymerization reaction was carried out for 60 min to yield 13.1 g of amorphous ethylene-hexene elastomer containing 30.0 mol. % of hexene.

Example 4

(A) Preparation of a supported catalyst containing the 1:1 complex from diglycolic acid and titanium tetraisopropoxide. Silica (Davison 955-600, calcined at 600° C. in air for 16 h, 1.0 g) was mixed with diglycolic acid (0.067 g, 0.50 mmol) and the mixture was slurried in 4 cc of THF at 25° C. Ti(Oi—Pr)$_4$ (0.15 cc, 0.50 mmol) was added to the slurry and the solvent was evaporated at 55°–60° C. to yield white powder.

(B) Ethylene-1-hexene Polymerization. A 0.5-liter reactor was filled with 200 cc of n-heptane and 5 cc of 1hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 100° C.; (c) 0.0103 g of the catalyst of Example 4-A (contains $5.2 \cdot 10^{-3}$ mmol Ti). Reactor was pressurized with hydrogen (25 psi) and ethylene was admitted to maintain a total pressure of 143 psig. The polymerization reaction was carried out for 60 min to yield 14.0 g of high density polyethylene (productivity ca. 2,700 g/mmol Ti) with $I_2$ of 1.1 and MFR of 32.9.

(C) Ethylene-1-hexene Copolymerization. A 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 90° C.; (c) 0.0023 g of the catalyst of Example 4-A (contains $1.15 \cdot 10^{-3}$ mmol Ti). Reactor was pressurized with hydrogen (10 psi) and ethylene was admitted to maintain a total pressure of 120 psig. The polymerization reaction was carried out for 20 min to yield 28.3 g of ethylene-hexene copolymer containing 7.0 mol. % of hexene (productivity ca. 24,600 g/g cat). The resin has an $I_{21}$ value of 7.7 and MFR of 42.4.

(D) High-temperature copolymerization. 0.5-liter reactor was filled with 100 cc of n-heptane and 50 cc of 1-hexene. The catalyst components were added to the autoclave in the following sequence: (a) 2.0 cc of 1.5 mol/l solution of Al(C$_2$H$_5$)$_2$Cl in heptane; (b) 1.0 cc of 1.0 mol/l solution of Mg(C$_4$H$_9$)$_2$ in heptane, after which the autoclave was heated to 150° C.; (c) 0.0198 g of the catalyst of Example 4-A. Ethylene was admitted to the reactor to maintain a total pressure of 150 psig. The polymerization reaction was carried out for 60 min to yield 12.5 g of ethylene-hexene elastomer containing 16.0 mol. % of hexene.

Example 5

(A) Synthesis of a 2:1 complex from diglycolic acid and titanium tetraisopropoxide. Diglycolic acid (0.268 g, 2.0 mmol) was dissolved in 5 cc of THF at 25° C. Ti(Oi—Pr)$_4$ (0.30 cc, 1.0 mmol) was added to the solution, the mixture was removed by evaporation at 55°–60° C. The residue is a viscous yellow liquid.

(B) Ethylene-1-hexene Copolymerization. A 0.5-liter reactor was filled with 200 cc of n-heptane and 5 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 90° C.; (c) 0.0005 g of the complex of Example 5-A (1.6·10$^{-3}$ mmol Ti). Ethylene was admitted to the autoclave to maintain a total pressure of 100 psig. The polymerization reaction was carried out for 120 min to yield 10.1 g of ethylene-hexene copolymer containing 0.6 mol. % if hexene (productivity ca. 6,300 g/mmol Ti).

Example 6

(A) Synthesis of a 2:1 complex from camphoric acid and titanium tetraisopropoxide. Camphoric acid (0.200 g, 1.0 mmol) was dissolved in 3 cc of THF at 25° C. Ti(Oi—Pr)$_4$ (0.30 cc, 1.0 mmol) was added to the solution, the mixture was stirred at 55° C. for 30 min and then the solvent was removed by evaporation at 55°–60° C. The residue is a heavy yellow liquid (0.168 g recovered). Its IR spectrum does not contain the O—H stretching band at ca. 2800 cm$^{-1}$ and the C=O stretching band at 1699 cm$^{-1}$ which are present in the spectrum of the acid.

(B) Ethylene-1-hexene Copolymerization. A 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.0008 g of the complex of Example 6-A (2.2·10$^{-3}$ mmol Ti). Ethylene was admitted to the autoclave to maintain a total pressure of 100 psig. The polymerization reaction was carried out for 18 min to yield 12.9 g of ethylene-hexene copolymer (productivity 16,100 g/g cat; ca. 5,800 g/mmol Ti) containing 1.4 mol. % of hexene with I$_{21}$ of 0.34. The copolymer has a melting point of 124.7° C.

Example 7

(A) Synthesis of a 1:1 complex from 2-hydroxybenzyl alcohol and titanium tetraisopropoxide. 2-hydroxybenzyl alcohol (0.124 g, 1.0 mmol) was dissolved in 5 cc of THF at 25° C. Ti(Oi—Pr)$_4$ (0.30 cc, 1.0 mmol) was added to the solution, the mixture was stirred at 55° C. for 30 min and then the solvent was removed by evaporation at 55°–60° C. The residue is a dark yellow tar, easily soluble in toluene (0.238 g recovered).

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 80° C.; (c) 0.5 cc of toluene solution of the complex of Example 7-A containing 1.0·10$^{-3}$ mmol Ti. Ethylene was admitted to the autoclave to maintain a total pressure of 100 psig. The polymerization reaction was carried out for 10 min to yield 15.0 g of ethylene-hexene copolymer (productivity 15,000 g/mmol Ti) containing 3.5 mol. % of hexene with I$_2$ of 0.27 and MFR of 42.3.

Example 8

(A) Synthesis of a 1:1 complex from 1,1'-bi-2-naphthol and titanium tetraisopropoxide. 1,1'-bi-2-naphthol (0.290 g, 1.0 mmol) was dissolved in 30 cc of THF at 25° C. Ti(Oi—Pr)$_4$ (0.30 cc, 1.0 mmol) was added to the solution, the mixture was stirred at 55° C. for 2 hours and then the solvent was removed by evaporation at 55°–60° C. The residue is a brown solid. Its IR spectrum does not contain the OH stretching bands at 3485 and 3402 cm$^{-1}$ which are present in the spectrum of 1,1'-bi-2-naphthol.

(B) Ethylene-1-hexene Copolymerization. 0.5-liter reactor was filled with 200 cc of n-heptane and 50 cc of 1-hexene. The catalyst components were added to the autoclave in the following sequence: (a) 2.0 cc of 1 mol/l solution of Al(CH$_3$)$_2$Cl in heptane; (b) 1.0 cc of 1.0 mol/l solution of Mg(C$_4$H$_9$)$_2$ in heptane, after which the autoclave was heated to 70° C.; (c) 1 cc of toluene solution of the complex of Example 8-A containing 2.31·10$^{-4}$ mmol Ti. Ethylene was admitted to the autoclave to maintain a total pressure of 70 psig. The polymerization reaction was carried out for 90 min to yield 15.5 g of ethylene-hexene copolymer containing 6.0 mol. % of hexene (productivity 44,700 g/mmol Ti.h). The resin has an I$_2$ value of 0.99 and the MFR value of 33.3; its melting point is 123.5° C.

(C) Propylene polymerization. 0.5-liter reactor was filled with 100 cc of n-heptane. The catalyst components were added to the autoclave in the following sequence: (a) 3.5 cc of 1.5 mol/l solution of Al(C$_2$H$_5$)$_2$Cl in heptane; (b) 1.8 cc of 1.0 mol/l solution of Mg(C$_4$H$_9$)$_2$ in heptane, after which the autoclave was heated to 70° C.; (c) 0.0034 g of the complex from Example 8-A dissolved in 3 cc of toluene. Propylene was admitted to the autoclave to maintain a total pressure of 95 psig. The polymerization reaction was carried out for 120 min to yield 4.3 g of semi-crystalline, partially isotactic polypropylene with a melting point of 158.3° C.

(D) Polymerization of 4-methyl-1-pentene. A 50-cc glass bottle containing a magnetic stirring bar was capped with a septum, flushed with nitrogen and filled with 20 cc of 4-methyl-1-pentene, 3.0 cc of 1.0 mol/l solution of Al(CH$_3$)$_2$Cl in heptane, and 1.5 cc of 1.0 mol/l solution of Mg(C$_4$H$_9$)$_2$ in heptane. After heating to 60° C., 0.0033 g of the complex from Example 8-A dissolved in 1.5 cc of toluene was added to the bottle and the polymerization reaction was carried out for 110 min. After that the contents of the bottle were poured into isopropanol and 8.8 g of amorphous poly-4-methyl-1-pentene were recovered.

Example 9

(A) Synthesis of a 1:1 complex from bis(2-hydroxyphenyl)methane and titanium tetraisopropoxide. Bis(2-hydroxyphenyl)methane (0.200 g, 1.0 mmol) was dissolved in 30 cc of THF at 25° C. Ti(Oi—Pr)$_4$ (0.30 cc, 1.0 mmol) was added to the solution, the mixture was stirred at 55° C. for 2 hours and then the solvent was removed by evaporation at 55°–60° C. The residue is a glossy yellow solid.

(B) Ethylene-1-hexene Copolymerization. 0.5-liter was filled with 200 cc of n-heptane and 50 cc of 1-hexene. The catalyst components were added to the autoclave in the following sequence: (a) 2.0 cc of 1.5 mol/l solution of Al(C$_2$H$_5$)$_2$Cl in heptane; (b) 1 cc of the toluene solution of the complex of Example 9-A containing 2.58·10$^{-4}$ mmol Ti, after which the autoclave was heated to 70° C.; (c) 1.0 cc of 10 wt. % solution of Mg(C$_6$H$_{13}$)$_2$ in heptane. Ethylene was admitted to the autoclave to maintain a total pressure of 100 psig. The polymerization reaction was carried out for 10 min at temperatures 80°–85° C. to yield 18.2 g of ethylene-hexene copolymer containing 3.2 mol. % (productivity 423,000 g/mmol Ti.h). The resin has an $I_2$ value of 0.28 and the MFR value of 40.2; its melting point is 122.4° C.

Example 10

(A) Preparation of a supported catalyst containing the 1:1 complex from bis(2-hydroxyphenyl)methane and titanium tetraisopropoxide. Silica (Davison 955-600, calcined at 600° C. in air for 16 h, 1.0g) was mixed with the solution of the complex of Example 8-A containing 0.50 mmol (0.281 g) of the complex in 15 cc of THF and the solvent was evaporated at 55°–60° C.

(B) Ethylene-1-hexene Copolymerization. 0.5-liter reactor was filled with 220 cc of n-heptane and 30 cc of 1-hexene. The catalyst components were added to the autoclave in the following sequence: (a) 1.0 cc of 1.5 mol/l solution of $Al(CH_3)_2Cl$ in heptane; (b) 0.5 cc of 1.0 mol/l solution of $Mg(C_4H_9)_2$ in heptane, after which the autoclave was heated to 70° C.; (c) 0.0040 g of the supported catalyst from Example 10-A containing 0.00156 mmol of the Ti complex. Ethylene was admitted to the autoclave to maintain a total pressure of 60 psig. The polymerization reaction was carried out for 55 min to yield 23.1 g of ethylene-hexene copolymer containing 3.3 mol. % of hexene (productivity 16,200 g/mmol Ti.h). The melt index of the resin is 0.21 and the MFR value is 35.6.

(C) High-temperature polymerization. 0.5-liter reactor was filled with 150 cc of n-heptane and 20 cc of 1-hexene. The catalyst components were added to the autoclave in the following sequence: (a) 1.0 cc of 1.5 mol/l solution of $Al(C_2H_5)_2Cl$ in heptane; (b) 1.0 cc of 0.5 mol/l solution of $Mg(C_4H_9)_2$ in heptane, after which the autoclave was heated to 150° C.; (c) 0.010 g of the complex of Example 11-A. Ethylene was admitted to the reactor to maintain a total pressure of 150 psig. The polymerization reaction was carried out for 60 min to yield 10.7 g of ethylene-hexene copolymer containing 2.6 mol. % of hexene with $I_{21}$ of 18.6 and MFR of 61.5.

Example 11

(A) Synthesis of 2:1 complex from 2,2'-biphenol and titanium tetraisopropoxide. 2,2'-biphenol (0.372 g, 2.0 mmol) was dissolved in 10 cc of THF at 25° C. $Ti(Oi-Pr)_4$ (0.30 cc, 1.0 mmol) was added to the solution, the mixture was stirred at 55° C. for 2 hours and then the solvent was removed by evaporation at 55°–60° C. The residue is a dark brown solid. Its IR spectrum does not contain the broad intense OH stretching band at 3130 $cm^{-1}$ which is present in the spectrum of 2,2'-biphenol.

(B) Ethylene-1-hexene Copolymerization. 0.5-liter reactor was filled with 150 cc of n-heptane and 100 cc of 1-hexene. The catalyst components were added to the autoclave in the following sequence: (a) 1.0 cc of 1.5 mol/l solution of $Al(C_2H_5)_2Cl$ in heptane; (b) 0.5 cc of 1.0 mol/l solution of $Mg(C_4H_9)_2$ in heptane, after which the autoclave was heated to 70° C.; (c) 1.5 cc of toluene solution of the complex of Example 12-A containing $9.60 \cdot 10^{-4}$ mmol Ti. Ethylene was admitted to the autoclave to maintain a total pressure of 80 psig. The polymerization reaction was carried out for 60 min to yield 26.5 g of ethylene-hexene copolymer containing 6.7 mol. % of hexene. The melt index of the resin is 0.69 and the MFR value is 40.1. The catalyst productivity is 18,100 g/mmol Ti.h.

Example 12

(A) Preparation of pre-polymerized, supported, preactivated catalyst containing a 1:1 complex from 2,2'-biphenol and titanium tetraisopropoxide. Dry silica (0.50 g, Davison 955-600, calcined at 600° C. in air for 16 h and treated with $AlEt_3$ at the $Al:SiO_2$ ratio of 0.72 mmol/g) was slurried in 3 cc of heptane. $Al(C_2H_5)_2Cl$ (2.18 mmol, 1.5 cc of heptane solution) was added to the slurry and it was cooled to ca. 0° C. $Mg(C_4H_9)_2$ (1 mmol, 1.0 cc of heptane solution) was added drop-wise to the slurry over a 2-min period. The slurry was warmed to 25° C. and the solution of the complex from Example 10-A containing 0.074 g of the complex (ca. 0.21 mmol) in 3 cc of toluene was added to the slurry. After that a stream of ethylene was passed over the stirred slurry for 3 min to produce a pre-polymerized supported catalyst.

(B) Ethylene-1-hexene Copolymerization. The 0.5-liter reactor was filled with 200 cc of n-heptane and 50 cc of 1-hexene. 0.3 cc of 20 wt. % $Al(C_2H_5)_3$ solution in heptane was added to the mixture, after which the autoclave was heated to 70° C. and 0.0375 g of the pre-polymerized, supported, preactivated catalyst from Example 13-A was added to the reactor. Ethylene was admitted to the autoclave to maintain a total pressure of 80 psig. The polymerization reaction was carried out for 120 min to yield 53.4 g of high molecular weight ethylene-hexene copolymer containing 0.7 mol. % of hexene with a melting point of 128.2° C.

Example 13

(A) Synthesis of catalyst containing a 1:1 complex from 2,2'-biphenol and titanium tetrachloride. 2,2'-biphenol (0.0812 g, 0.436 mmol) was dissolved in 40 cc of THF at 25° C. and heated to 55° C. Titanium tetrachloride, $TiCl_4$ (3.0 cc of 0.145M solution in heptane, 0.436 mmol) was added to the solution which was then stirred at 55° C. for 40 min. 2.0 g of silica (Davison 955-600, calcined at 600° C. in air for 16 h) was added to the solution, it was stirred for 1 h and then the solvent was removed by evaporation at 55°–60° C.

(B) Ethylene-1-hexene Copolymerization. 1.6-liter reactor was filled with 750 cc of n-heptane and 60 cc of 1-hexene. The catalyst components were added to the autoclave in the following sequence: (a) 3.0 cc of 1 mol/l solution of $Al(CH_3)_2Cl$ in heptane; (b) 1.35 cc of 0.74 mol/l solution of $Mg(C_4H_9)_2$ in heptane, after which the autoclave was heated to 80° C.; (c) 0.0080 g of catalyst from Example 14-A containing $1.64 \cdot 10^{-3}$ mmol Ti. Ethylene was admitted to the autoclave to maintain a total pressure of 40 psig. The polymerization reaction was carried out for 60 min to yield 67.8 g of ethylene-hexene copolymer containing 2.4 mol. % of hexene. The resin has an $I_{21}$ value of 2.7; its melting point is 122.2° C. The catalyst productivity is 41,400 g/mmol Ti.h.

Example 14

(A) Synthesis of catalyst containing a 1:1 complex from 1,1'-bi-2-naphthol and titanium tetrachloride. 1,1'-bi-naphthol (0.123 g, 0.430 mmol) was dissolved in 40 cc of THF at 25° C. under nitrogen and heated to 55° C. $TiCl_4$ (2.97 cc of 0.145M solution in heptane, 0.436 mmol) was added to the solution which was then stirred at 55° C. for 1.5 hours. 2.0 g of silica (Davison 955-600, calcined at 600° C. in air for 16 h) was added to the solution, it was stirred for 1 h and then the solvent was removed by evaporation at 55°–60° C.

(B) Ethylene-1-hexene Copolymerization. 1.6-liter reactor was filled with 750 cc of n-heptane and 60 cc of 1-hexene. The catalyst components were added to the autoclave in the following sequence: (a) 3.0 cc of 1 mol/l solution of Al(CH$_3$)$_2$Cl in heptane; (b) 1.35 cc of 0.74 mol/l solution of Mg(C$_4$H$_9$)$_2$ in heptane, after which the autoclave was heated to 80° C.; (c) 0.0109 g of catalyst from Example 15-A containing 2.16·10$^{-3}$ mmol Ti. Ethylene was admitted to the autoclave to maintain a total pressure of 40 psig. The polymerization reaction was carried out for 60 min to yield 82.8 g of ethylene-hexene copolymer containing 2.4 mol. % of hexene. The resin has an I$_{21}$ value of 2.4; its melting point is 122.4° C. The catalyst productivity is 38,300 g/mmol Ti.h.

(C) Ethylene-1-hexene Copolymerization. 1.6-liter reactor was filled with 750 cc of n-heptane and 60 cc of 1-hexene. The catalyst components were added to the autoclave in the following sequence: (a) 3.0 cc of 1 mol/l solution of Al(CH$_3$)$_2$Cl in heptane; (b) 1.35 cc of 0.74 mol/l solution of Mg(C$_4$H$_9$)$_2$ in heptane, after which the autoclave was heated to 80° C. and pressurized with 5.5 psi of hydrogen; (c) 0.0163 g of the catalyst from Example 15-A containing 3.23·10$^{-3}$ mmol Ti. Ethylene was admitted to the autoclave to maintain a total pressure of 41 psig. The polymerization reaction was carried out for 60 min to yield 53.4 g of ethylene-hexene copolymer containing 3.2 mol. % of hexene. The resin has an I$_{21}$ value of 1.25 and MFR of 29.9; its melting point is 125.7° C. The catalyst productivity is 16,500 g/mmol Ti.h.

Example 15

(A) Synthesis of a 1:1 complex from 1,1'-bi-2-naphthol and zirconium tetraisopropoxide. 1,1'-bi-naphthol (0.290 g, 1.0 mmol) was dissolved in 10 cc of THF at 25° C. Zirconium tetraisopropoxide (0.30 cc, 1.0 mmol) was added to the solution, the mixture was stirred at 55° C. for 2 hours and then the solvent was removed by evaporation at 55°–60° C. The residue is a pale-yellow solid.

(B) Ethylene-1-hexene Copolymerization. 0.5-liter reactor was filled with 200 cc of n-heptane and 50 cc of 1-hexene. The catalyst components were added to the autoclave in the following sequence: (a) 2.0 cc of 1.0 mol/l solution of Al(CH$_3$)$_2$Cl in heptane; (b) 1.0 cc of 1.0 mol/l solution of Mg(C$_4$H$_9$)$_2$ in heptane, after which the autoclave was heated to 70° C.; (c) 2 cc of toluene solution of complex of Example 16-A containing 0.0187 mmol Zr. Ethylene was admitted to the autoclave to maintain a total pressure of 100 psig. The polymerization reaction was carried out for 60 min to yield 13.5 g of high molecular weight ethylene-hexene copolymer containing 1.0 mol. % of hexene with a melting point of 126.6° C.

Example 16

(A) Synthesis of a 1:1 complex from 2,2'-biphenol and vanadyl triisopropoxide. 2,2'-biphenol (0.186 g, 1.0 mmol) was dissolved in 5 cc of THF at 25° C. Vanadyl triisopropoxide, V(=O)(Oi—Pr)$_3$ (0.242 cc, 1.0 mmol) was added to the solution, the mixture was stirred at 55° C. for 2 hours, and then the solvent was removed by evaporation at 55°–60° C. The residue is a black tar readily soluble in toluene.

(B) Ethylene-1-hexene Copolymerization. 0.5-liter reactor was filled with 200 cc of n-heptane and 50 cc of 1hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 1 cc of toluene solution of complex of Example 16-A containing 0.0145 mmol V. Ethylene was admitted to the autoclave to maintain a total pressure of 100 psig. The polymerization reaction was carried out for 60 min to yield 8.7 g of high molecular weight ethylene-hexene copolymer containing 3.1 mol. % of hexene with a melting point of 25.5° C.

(C) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 1.325 mmol of 1,1,1-trichloroethane (a catalyst modifier); (d) 1 cc of toluene solution of complex of Example 17-A containing 0.0145 mmol V. Ethylene was admitted to the autoclave to maintain a total pressure of 100 psig. The polymerization reaction was carried out for 120 min to yield 23.8 g of amorphous ethylene-hexene elastomer containing 22.5 mol. % of hexene.

Example 17

(A) Synthesis of a 1:1 complex from cis-1,2-diaminocyclohexane and titanium tetraisopropoxide. 1,2-diaminocyclohexane (0.124 g, 1.09 mmol) was dissolved in 2.5 cc of THF at 25° C. Ti(Oi—Pr)$_4$ (0.33 cc, 1.1 mmol) was added to the solution, the mixture was stirred at 55° C. for 30 min and then the solvent was removed by evaporation at 55°–60° C. The residue is a yellow liquid (0.355 g recovered).

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.0008 g of complex of Example 18-A in 2 cc of toluene containing 2.9·10$^{-3}$ mmol Ti. Ethylene was admitted to the autoclave to maintain a total pressure of 100 psig. The polymerization reaction was carried out for 25 min to yield 17.1 g of high molecular weight ethylene-hexene copolymer (yield 21,400 g/g cat) containing 0.9 mol. % of hexene.

Example 18

(A) Synthesis of a 1:1 complex from 1,4,7-triazacyclononane and titanium tetraisopropoxide. 1,4,7-triazacyclononane (0.095 g, 0.736 mmol) was dissolved in 2.5 cc of THF at 25° C. Ti(Oi—Pr)$_4$ (0.22 cc, 0.74 mmol) was added to the solution, the mixture was stirred at 55° C. for 30 min and then the solvent was removed by evaporation at 55°–60° C. The residue is an amorphous brown-gray solid (0.162 g recovered) readily soluble in toluene.

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.0025 g of complex of Example 19-A in 2 cc of toluene containing 0.0106 mmol Ti. Ethylene was admitted to the autoclave to maintain a total pressure of 100 psig. The polymerization reaction was carried out for 12 min to yield 11.1 g ethylene-hexene copolymer containing 1.6 mol. % of hexene with an I$_{21}$ of 0.23. The copolymer has a melting point of 123.9° C.

Example 19

(A) Synthesis of a 1:1 complex from diethanolamine and titanium tetraisopropoxide. Diethanolamine (0.234 g, 2.23 mmol) was dissolved in 5 cc of THF at 25° C. Ti(Oi—Pr)$_4$ (0.67 cc, 2.23 mmol) was added to the solution, the mixture was stirred at 55° C. for 30 min, and then the solvent was removed by evaporation at 55°–60° C. The residue is an amorphous yellow solid (0.288 g recovered) readily soluble in toluene.

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 1 cc of toluene solution containing 7·10$^{-5}$ g of complex of Example 20-A. Ethylene was admitted to the autoclave to maintain a total pressure of 100 psig. The polymerization reaction was carried out for 120 min to yield 14.7 g ethylene-hexene copolymer containing 0.6 mol. % of hexene with I$_{21}$ of 0.12. The copolymer has a melting point of 127.7° C.

Example 20

(A) Synthesis of a 1:1 complex from L-glutamic acid and titanium tetraisopropoxide. L-glutamic acid (0.147 g, 1.0 mmol) was dissolved in 3 cc of THF at 25° C. Ti(Oi—Pr)$_4$ (0.30 cc, 1.0 mmol) was added to the solution, the mixture was stirred at 55° C. for 30 min, and then the solvent was removed by evaporation at 55°–60° C. The residue is a heavy yellow liquid (0.173 g recovered).

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.0014 g of complex of Example 21-A. Ethylene was admitted to the autoclave to maintain a total pressure of 100 psig. The polymerization reaction was carried out for 60 min to yield 8.2 g of ethylene-hexene copolymer containing 0.9 mol. % of hexene with I$_{21}$ of 0.17.

Example 21

(A) Synthesis of a 1:1 complex from 1-[N,N-bis(2-hydroxyethyl)amino]-2-propanol and titanium tetraisopropoxide. 1-[N,N-bis(2-hydroxyethyl)amino]-2propanol (0.164 g, 1.01 mmol) was dissolved in 3 cc of THF at 25° C. Ti(Oi—Pr)$_4$ (0.30 cc, 1.0 mmol) was added to the solution, the mixture was stirred at 55° C. for 30 min and then the solvent was removed by evaporation at 55°–60° C. The residue is a heavy yellow liquid (0.204 g recovered). This synthesis was repeated using chloroform as a solvent and produced the same product.

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 70° C.; (c) 0.0020 g of complex of Example 22-A. Ethylene was admitted to the autoclave to maintain a total pressure of 100 psig. The polymerization reaction was carried out for 32 min to yield 14.7 g of high molecular weight ethylene-hexene copolymer containing 0.65 mol. % of hexene.

Example 22

(A) Synthesis of a 1:1 complex from diphenic acid and titanium tetraisopropoxide. Diphenic acid (0.242 g, 1.01 mmol) was dissolved in 4 cc of THF at 25° C. Ti(Oi—Pr)$_4$ (0.30 cc, 1.0 mmol) was added to the solution, the mixture was stirred at 55° C. for 30 min and then the solvent was removed by evaporation at 55°–60° C. The residue is a white crystalline solid.

(B) Ethylene-1-hexene Copolymerization. 0.5-liter reactor was filled with 200 cc of n-heptane and 50 cc of 1-hexene. The catalyst components were added to the autoclave in the following sequence: (a) 1.0 cc of 1.5 mol/l solution of Al(C$_2$H$_5$)$_2$Cl in heptane; (b) 0.5 cc of 1.0 mol/l solution of Mg(C$_4$H$_9$)$_2$ in heptane, after which the autoclave was heated to 90° C.; (c) hydrogen, 20 psi; (d) 0.2 cc of toluene solution of the complex of Example 23-A containing 7.4·10$^{-4}$ mmol Ti. Ethylene was admitted to the autoclave to maintain a total pressure of 130 psig. The polymerization reaction was carried out for 30 min to yield 32.2 g of ethylene-hexene copolymer containing 2.2 mol. % of hexene (productivity 85,000 g/mmol Ti.h). The resin has an 12 value of 1.5 and the MFR value of 29.2.

Comparative Example 1. 0.5-liter reactor was filled with 200 cc of n-heptane and 50 cc of 1-hexene. Methylaluminoxane (1 cc of toluene solution, contains 15.8 wt. % Al) was used a cocatalyst. The autoclave was heated to 70° C. and the toluene solution of the complex of Example 8-A containing 0.0069 mmol Ti was added to the reactor. Ethylene was admitted to the autoclave to maintain a total pressure of 180 psig. The polymerization reaction was carried out for 50 min to yield 6.0 g ethylene-hexene copolymer containing 6.0 mol. % of hexene with the melting point of 123.9° C. The catalyst productivity is 1040 g/mmol Ti.h, which is ca. 40 times lower than in the case of the same Ti complex activated by a combination of dialkylaluminum chloride and dialkylmagnesium (Example 8-B).

Comparative Examples 2–7. A series of ethylene polymerization experiments with the complexes of Example 7, Example 8 and Example 11 (ranging in amount from 0.0005 to 0.0012 mmol) were carried out in which various organometallic compounds were tested as cocatalysts: Al(C$_2$H$_5$)$_3$, Al(C$_2$H$_5$)$_2$Cl, Al(CH$_3$)$_2$Cl, Mg(C$_4$H$_9$), combinations of Mg(C$_4$H$_9$) with Al(C$_2$H$_5$)$_2$F and with Al(C$_2$H$_5$)$_2$OC$_2$H$_5$. None of these organometallic compounds, when used alone, or the said combinations, could activate the Ti complexes for ethylene polymerization.

The FIGURE shows a relation between the melting points of ethylene-hexene copolymers prepared with the catalysts of this application as a function of their hexene content. The figure contains two lines. The upper line gives the melting points of the copolymers prepared with a typical supported titanium-based polymerization catalyst using Al(C$_2$H$_5$)$_3$ as a cocatalyst. The melting points of these copolymers decrease only slightly with an increase of their hexene content. The lower curve gives the melting points of ethylene copolymers prepared with metallocene catalysts activated by methylaluminoxane, such copolymers have uniform compositional distributions. The data for the copolymers prepared with the catalysts of this invention (points) show that their melting points are uniformly lower than those for the copolymers the same hexene content prepared with common titanium-based polymerization catalysts. This difference indicates that the ethylene copolymers prepared with the catalyst systems of this invention have quite uniform compositional distributions.

What is claimed is:

1. A catalyst composition for olefin polymerization and copolymerization comprising (A) and (B), wherein (A) is a 1:1 reaction product of diglycolic acid and titanium tetraisopropoxide and wherein (B) is a combination of an alkylaluminum halide and an organomagnesium compound, wherein the combination is at a molar [Al]:[Mg] ratio of greater than 1.

2. The catalyst composition of claim 1, wherein the alkylaluminum halide is dialkylaluminum halide.

3. A catalyst composition for olefin polymerization and copolymerization comprising (A) and (B), wherein (A) is a reaction product of diglycolic acid and titanium tetraisopropoxide in which the ratio of diglycolic acid to titanium tetraisopropoxide is 2:1, and wherein (B) is a combination of an alkylaluminum halide and an organomagnesium compound, wherein the combination is at a molar [Al]:[Mg] ratio of greater than 1.

4. The catalyst composition of claim 3, wherein the alkylaluminum halide is dialkylaluminum halide.

5. A catalyst composition for olefin polymerization and copolymerization comprising (A) and (B), wherein (A) is a reaction product of camphoric acid and titanium tetraisopropoxide in which the ratio of camphoric acid to titanium tetraisopropoxide is 2:1, and wherein (B) is a combination of an alkylaluminum halide and an organomagnesium compound, wherein the combination is at a molar [Al]:[Mg] ratio of greater than 1.

6. The catalyst composition of claim 5, wherein the alkylaluminum halide is dialkylaluminum halide.

7. A catalyst composition for olefin polymerization and copolymerization comprising (A) and (B), wherein (A) is a 1:1 reaction product of cis-1,2-diaminocyclohexane and titanium tetraisopropoxide and wherein (B) is a combination of an alkylaluminum halide and an organomagnesium compound, wherein the combination is at a molar [Al]:[Mg] ratio of greater than 1.

8. The catalyst composition of claim 7, wherein the alkylaluminum halide is dialkylaluminum halide.

9. A catalyst composition for olefin polymerization and copolymerization comprising (A) and (B), wherein (A) is a 1:1 reaction product of 1,4,7-triazacyclononane and titanium tetraisopropoxide and wherein (B) is a combination of an alkylaluminum halide and an organomagnesium compound, wherein the combination is at a molar [Al]:[Mg] ratio of greater than 1.

10. The catalyst composition of claim 9, wherein the alkylaluminum halide is dialkylaluminum halide.

11. A catalyst composition for olefin polymerization and copolymerization comprising (A) and (B), wherein (A) is a 1:1 reaction product of diethanolamine and titanium tetraisopropoxide and wherein (B) is a combination of an alkylaluminum halide and an organomagnesium compound, wherein the combination is at a molar [Al]:[Mg] ratio of greater than 1.

12. The catalyst composition of claim 11, wherein the alkylaluminum halide is dialkylaluminum halide.

13. A catalyst composition for olefin polymerization and copolymerization comprising (A) and (B), wherein (A) is a 1:1 reaction product of L-glutamic acid and titanium tetraisopropoxide and wherein (B) is a combination of an alkylaluminum halide and an organomagnesium compound, wherein the combination is at a molar [Al]:[Mg] ratio of greater than 1.

14. The catalyst composition of claim 13, wherein the alkylaluminum halide is dialkylaluminum halide.

15. A catalyst composition for olefin polymerization and copolymerization comprising (A) and (B), wherein (A) is a 1:1 reaction product of 1-[N,N-bis(2-hydroxyethyl)amino]-2-propanol and titanium tetraisopropoxide and wherein (B) is a combination of an alkylaluminum halide and an organomagnesium compound, wherein the combination is at a molar [Al]:[Mg] ratio of greater than 1.

16. The catalyst composition of claim 15, wherein the alkylaluminum halide is dialkylaluminum halide.

17. A catalyst composition for olefin polymerization and copolymerization comprising (A) and (B), wherein (A) is a 1:1 reaction product of diphenic acid and titanium tetraisopropoxide and wherein (B) is a combination of an alkylaluminum halide and an organomagnesium compound, wherein the combination is at a molar [Al]:[Mg] ratio of greater than 1.

18. The catalyst composition of claim 17, wherein the alkylaluminum halide is dialkylaluminum halide.

19. A catalyst composition for olefin polymerization and copolymerization consisting of A and B, wherein (A) is a 1:1 reaction product of 2,2'-biphenol and vanadyl triisopropoxide; and (B) is a combination of an alkylaluminum halide and an organomagnesium compound, wherein the combination is at molar (Al):(Mg) ratio of greater than 1.

* * * * *